3,236,894
SELECTED FLUORINE-CONTAINING AROMATIC TERTIARY ALCOHOLS AND THE PREPARATION THEREOF

David C. England, Wilmington, Del., assignor to E. I. du Pont de Nemours and Company, Wilmington, Del., a corporation of Delaware
No Drawing. Filed May 3, 1961, Ser. No. 107,296
17 Claims. (Cl. 260—574)

This invention relates to, and has as its principal objects provision of, novel fluorine-containing tertiary aromatic alcohols and methods for their preparation.

The products of this invention are tertiary fluoroalcohols of the structure

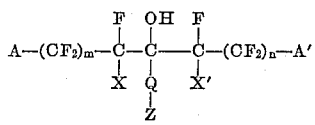

wherein: $m$ and $n$ are cardinal numbers of from 0 to 7; X and X' are halogen of atomic number 9 through 35; A and A' are hydrogen or halogen of atomic number 9 through 35; Q is a divalent aromatic radical, particularly arylene or oxydiarylene, as defined more precisely below; and Z is hydrogen or

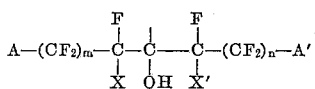

A, A', X, X', $m$ and $n$ being as before.

The above-defined products are obtained by reacting acyclic fluoroketones of the formula:

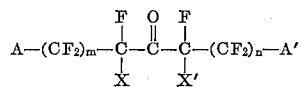

with (1) Z–Q–H compounds capable of undergoing the Friedel-Crafts reaction wherein Z and Q are as previously defined or with (2) compounds of the formula Z–Q–MX$_a$'', wherein Z and Q are as previously defined, X'' is halogen of atomic number 17–53, i.e., chlorine, bromine, and iodine, M is a metal capable of forming an organometallic compound with Z–Q–X$_a$'', and $a$ is a cardinal number, one less than the valence of M, between 0 and 2, followed by hydrolysis of the immediate product of the reaction.

In the reaction employing the Z–Q–H coreactant, a ring carbon of the coreactant adds across the ketone carbonyl group to form a hydroxyl substitutent and the aromatic moiety (Z–Q–) formed by abstraction of the hydrogen adds to the carbon which carries the hydroxyl group. This reaction may be illustrated schematically by the following equation:

(1)
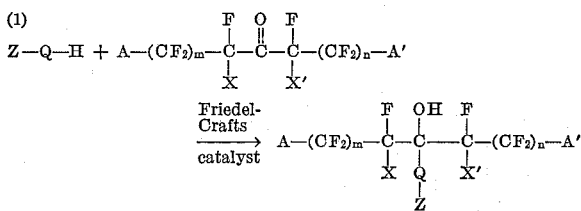

The use of a Z–Q–MX$_a$'' reagent, followed by hydrolysis, may be schematically represented as follows:

(2 and 2a)
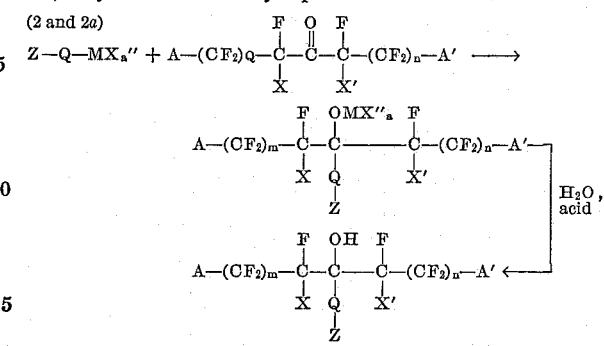

In the above equations, the —Q— moiety of the product corresponds to the —Q— moiety of the precursor compound. Preferably, this moiety is a divalent carbocyclic aromatic radical, particularly arylene or oxydiarylene, having up to 18 carbon atoms in the aryl system. The carbocyclic rings of the aromatic system may be benzenoid as in phenylene or diphenylene, oxydiarylene where the arylene nuclei are monocyclic as in oxydiphenyl, mixed monocarbocyclic-condensed carbocyclic as in oxyphenylnaphthyl, or polynuclear (fused) as in phenanthryl, naphthyl, anthracyl, etc. Any or all of the rings can be unsubstituted or can carry substituents with up to 15 carbons. These substituents may be hydrocarbon, e.g., alkyl, preferably short chain or lower alkyl, i.e., up to 7 carbon atoms, or cycloalkyl, preferably up to 8 carbon atoms, or nonhydrocarbon, e.g., halogen including fluorine, chlorine, bromine, or iodine, dialkylamino in which the alkyl groups contain no more than 14 carbon atoms, alkoxy in which the alkyl group contains no more than 7 carbon atoms, hydroxyl, nitro, and alkoxycarbonyl, particularly where the alkyl group is of up to 7 carbons. The rings may be mono-, di- or trisubstituted. When they are monosubstituted, the substituents can be any of the above-mentioned groups, as in Examples IV, V, VI, VIII, X, and XVI and in the following paragraph. When they are disubstituted, the substituents can be the alkyl, hydroxyl, alkoxy, nitro or halogen groups mentioned above, as in Examples VII, XV, in the following paragraph, and in the second example of Table I. When they are trisubstituted, the substituents can be the alkyl and hydroxyl groups mentioned above provided that at least two of three groups are alkyl, as exemplified in the following paragraph and in the fourth example of Table I.

Examples of Z—Q—H compounds usable in the process of the invention are benzene, naphthalene, anthracene, methyl naphthalene, toluene, ethyl-, propyl-, decyl-, and dodecylbenzenes, xylenes, cyclohexylbenzene, 1-methyl-3-butylbenzene, 1-ethyl-4-octylbenzene, fluorobenzene, chlorobenzene, 2-methyl-4-bromobenzene, 2,3-dichlorobenzene, iodobenzene, 2,4-dibromobenzene, phenol, 1-hydroxy-2-methylbenzene, 1-hydroxy-4-hexylbenzene, 1,4-dihydroxybenzene, methoxybenzene, butoxybenzene, 1-methyl-4-ethoxybenzene, 1,3,5,-trimethylbenzene, N,N-dimethylaniline, N,N-diethyl toluidine, methyl benzoate, hexyl benzoate, butyl toluate, methyl salicylate, diphenyl ether, tolyl phenyl ether, and the like. Examples of Z—Q—MX$_a$'' compounds are phenylmagnesium bromide and chloride, tolylzinc bromide, naphthylmagnesium bromide, lithium phenyl, lithium naphthyl, and the like.

It will be evident from the equations above that, when one mole of the Z—Q—H or Z—Q—MX$_a$" compound per mole of fluoroketone is reacted, the product is monohydric tertiary fluoroaromatic alcohol. This is also true when the Z—Q—H coreactant is monofuntcional with respect to the fluoroketone, i.e., when it has but one position capable of participating in the reaction with the fluoroketone. In such instances either the Z—Q—H or Z—Q—MX$_a$" compound can be used in excess, desirable to assure complete ultilization of the ketone.

When, however, the Z—Q—H compound is bifunctional with respect to the fluoroketone, i.e., when it has two positions capable of participating in the reaction with the fluoroketone, there may be produced dihydric tertiary fluoroaromatic alcohols employing two moles of fluoroketone per mole of Z—Q—H compound. If desired, the fluoroketone can be used in excess of two moles per mole of the coreactant to assure complete utilization of the latter.

With low boiling fluoroketones, either reaction is carried out under reflux conditions employing a condenser cooled with solid carbon dioxide. If desired, however, the reaction can be conducted in a sealed reactor at temperatures above the boiling point of the ketone and these will be from 0° to 350° C. Under these conditions the pressure at which the reaction is carried out is autogenous. Externally applied pressures can be used but have no practical advantage.

The procedure employed, i.e., whether that of Equation 1 or Equation 2, above, will determine the time of recation but in general the reaction will be essentially complete in times varying from a few minutes to several hours. Usually shorter times of reaction will be required by the method of Equation 2 than by that of Equation 1.

The adidtion of the aromatic coreactant to the carbonyl group of the fluoroketone is generally effected with the aid of Friedel-Crafts catalysts, such as aluminum chloride and bromide, boron trichloride and trifluoride, antimony pentachloride, zinc dichloride and ferric chloride. The Friedel-Crafts catalysts will normally be used in amounts from 0.1% to 5% by weight of the ketone and/or aromatic coreactants. As shown by Examples V and X below, with aryl compounds carrying nonhydrocarbon substituents, the reaction can be made to take place without catalysts, but, in general, higher temperatures will be required and the yields may be lower.

The reaction employing the Friedel-Crafts catalyst can be effected in the presence or absence of an organic inert liquid reaction medium which, if used, should be anhydrous. Suitable media are the normally liquid aliphatic and cycloaliphatic hydrocarbons, e.g., hexanes, heptanes, octanes, etc., cyclohexane, methylcyclohexane, etc., ethers, e.g., diethyl ether, dibutyl ether, carbon bisulfide, dioxane, tetrahydrofuran, nitrobenzene, etc. The choice of a particular reaction medium will depend upon the particular aromatic coreactant and other variables.

In the reaction of Equation 2 any organometallic compound can be used. It is understood that in this procedure an additional step of hydrolysis with diluent mineral acid, Equation 2a, is necesary to obtain the fluorine-containing tertiary aromatic alcohol. When an organometallic reagent is used, a reaction medium will obviously be employed, suitable media being the ethers, e.g., diethyl ether, dibutyl ether, etc.

There follow some examples which are submitted to illustrate and not to limit this invention. In these examples, all pressures are ambient atmospheric or, with closed reactors, autogenous.

EXAMPLE I

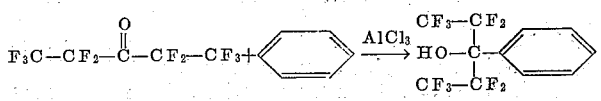

To a mixture of 11.6 g. (43.5 millimoles) of perfluorodiethyl ketone and 15 ml. of benzene there was added 0.3 g. of anhydrous aluminum chloride. The reaction mixture was heated to reflux under a condenser cooled with solid carbon dioxide for three hours. By distillation into a cold trap there was recovered 2.6 g. of unreacted ketone. The remaining benzene solution was washed three times with 20% hydrochloric acid and three times with water. The benzene solution was dried and distilled. After removal of the benzene, there was obtained 4.4 g. (3%) of a colorless liquid, phenylbis(perfluoroethyl)carbinol, B.P. 81° C./3 mm., which analyzed:

*Analysis.*—Calcd. for $C_{11}H_6F_{10}O$: C, 38.37%; H, 1.76%; F, 55.20%. Found: C, 38.81%; H, 2.0%; F, 55.15%.

The nuclear magnetic resonance at 56.4 mc./sec. correspond to phenyl-bis(perfluoroethyl)carbinol, showing resonance at 53 c.p.s. and 2400 c.p.s. (on the high field side relative to $CF_3CO_2H$ as a reference) in an approximate ratio of 3:2.

EXAMPLE II

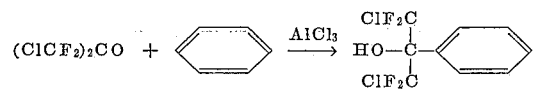

A mixture of 20 g. of s-dichlorotetrafluoroacetone, 45 ml. of benzene, and 1 g. of aluminum chloride was refluxed for one hour. The dark mixture was then washed with dilute hydrochloric acid and extracted with ether. The ether extract was dried and distilled to give 10.6 g. (41%) of product, α,α-bis(chlorodifluoromethyl)benzyl alcohol, B.P. 99° C. (8 mm.); $n_D^{25}$, 1.4721. The above structure was supported by n-m-r, infrared, and elemental analyses.

*Analysis.*—Calcd. for $C_9H_6F_4Cl_2O$: C, 39.0%; H, 2.2%; F, 27.4%; Cl, 26.6%. Found: C, 39.9%; H, 2.7%; F, 27.8%; Cl, 25.3%.

EXAMPLE III

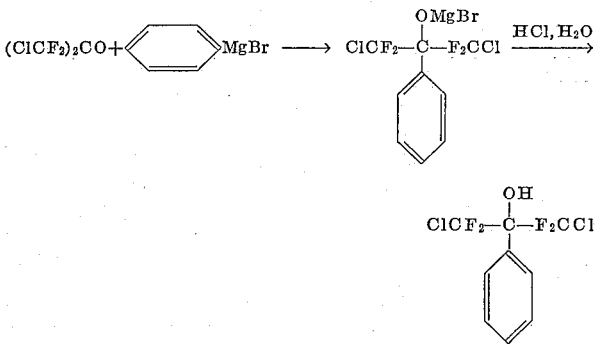

A mixture of 330 ml. of 3 N phenylmagnesium bromide in ether (1.0 mole) and 350 ml. of ether was stirred and cooled to −50° C. s-Dichlorotetrafluoroacetone (1.99 g., 1.0 mole) was added dropwise at such a rate that the temperature never rose above −40° C. Hydrochloric acid (10%) was added until all solids dissolved. The organic layer was separated, washed with water, and dried over silica gel. Distillation gave 207 g. (75%) of α,α-bis(chlorodifluoromethyl)benzyl alcohol, B.P. 80° C. (5 mm.). Fuorine n-m-r and infrared spectra of the product were identical with those of the product formed by the addition of benzene to the ketone.

EXAMPLE IV

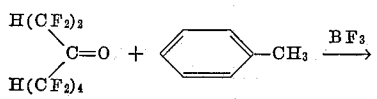

1,7-dihydroperfluoroheptane-3-one (16.5 g., 0.5 mole), 16 ml. (0.15 mole) of toluene, and 3 g. of boron trifluoride were heated together in a sealed tube overnight on a steam bath. The tube was opened and the contents distilled to give starting materials and 1.8 g. of a higher-boiling oil. All recovered materials (except boron trifluoride) were refluxed together with 1 g. of aluminum chloride for five hours. The resulting black mixture was distilled to give starting materials and 1.6 g. boiling at about 70° C. (1 mm.); $n_D^{25}$, 1.4095. Elemental and infrared analyses indicated that this material was the tertiary alcohol, 1H,7H-3-p-methylphenylperfluoroheptane-3-ol.

*Analysis.*—Calcd. for $C_{14}H_{10}F_{12}O$: C, 39.8%; H, 2.4%; F, 54.0%. Found: C, 40.5%; H, 2.8%; F, 53.0%.

EXAMPLE V

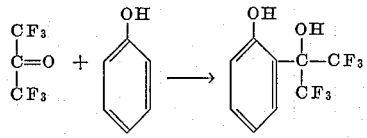

A mixture of 4.7 g. of phenol and 9.2 g. of hexafluoroacetone was heated in a sealed heat-resistant glass tube at 200° C. for eight hours. Thereafter the reactor was allowed to cool and the contents discharged. The reaction mixture was dissolved in warm hexane and allowed to cool to ambient temperature. The solid which separated was collected by filtration and then recrystallized again from hexane. The crystalline solid, bis(trifluoromethyl)-o-hydroxyphenylcarbinol, was separated by filtration and dried. It weighed 4.8 g., was colorless, and melted at 77° to 79° C.

By distillation of the filtrate from the initial hexane treatment, there was obtained an additional 2 g. of product boiling at 106° to 115° C. at 20 mm., which solidified and was shown by infrared to be bis(trifluoromethyl)-o-hydroxyphenyl carbinol.

The product was shown to be the ortho isomer by its infrared spectrum, since it showed no strong absorption in the 12μ region.

*Analysis.*—Calcd. for $C_9H_6F_6O_2$: C, 41.56%; H, 2.32%; F, 43.82%. Found: C, 41.73%; H, 2.48%; F, 44.26%, 44.10%.

EXAMPLE VI

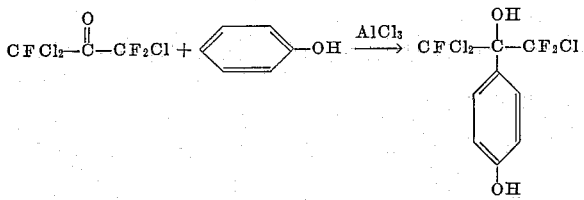

A mixture of 56 g. (0.25 mole) of trichlorotrifluoroacetone and 23.5 g. (0.25 mole) of phenol was stirred and heated to reflux. Aluminum chloride (1 g.) was added cautiously and the mixture was stirred and refluxed for three hours. The mixture solidified and was cooled. It was recrystallized from hexane to give 43 g. (54%) of α-(chlorodifluoromethyl) - α - (dichlorofluoromethyl) - 4-hydroxybenzyl alcohol as colorless needles, M.P. 142–143° C., pK$_a$ 5.50.

*Analysis.*—Calcd. for $C_9H_6Cl_3F_3O_2$: C, 34.96; H, 1.96; Cl, 34.37; F, 18.42; N.E., 309.5. Found: C, 34.96; H, 1.96; Cl. 34.35; F, 18.30%; N.E. 304.

EXAMPLE VII

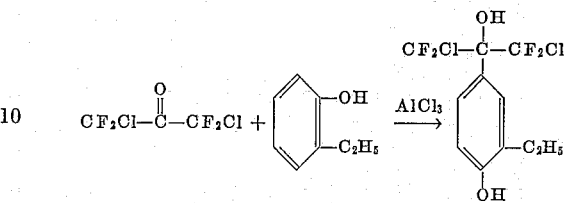

A mixture of 0.5 g. of aluminum chloride, 20 g. (0.1 mole) of dichlorotetrafluoroacetone and 10 g. (0.1 mole) of o-ethyl phenol was heated under reflux for four hours and then cooled. The partially solidified reaction mixture was recrystallized once from hexane and once from pentane to yield 20 g. of α,α-bis(chlorodifluoromethyl)-4-hydroxy-3-ethylbenzyl alcohol as colorless prisms, M.P. 80° C., pK$_a$ 5.4.

*Analysis.*—Calcd. for $C_{11}H_{10}Cl_2F_4O_2$: C, 41.14; H, 3.14; Cl, 22.08; F, 23.76. Found: C, 41.06; H, 3.06; Cl. 22.15; F, 24.13.

EXAMPLE VIII

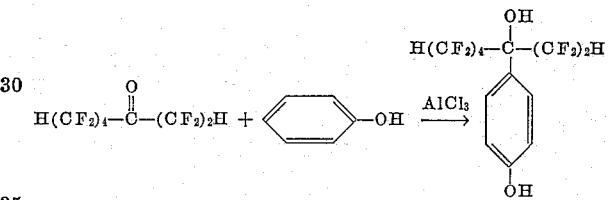

A mixture of 16.5 g. (0.05 mole) of 1,7-dihydroperfluoroheptan-3-one, 9.4 g. (0.1 mole) of phenol, and 0.5 g. of aluminum chloride was stirred and slowly heated to 150° C. The reaction mixture solidified when cooled. The solid was recrystallized twice from hexane to give 11.4 g. of 1,7-dihydro-3-p-hydroxyphenylperfluoroheptan-3-ol as colorless needles, M.P. 88–89° C., pK$_a$ 5.8.

*Analysis.*—Calcd. for $C_{13}H_8F_{12}O_2$: C, 36.81%; H, 1.90%; F, 53.75%; N.E., 424. Found: C, 38.40%; H, 2.07%; F, 53.92%; N.E. 416.

EXAMPLE IX

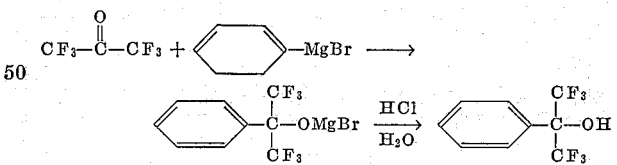

Hexafluoroacetone, 26 g. (0.15 mole), was slowly condensed into 50 ml. of a rapidly stirred 3 N solution of phenylmagnesium bromide in diethyl ether, and the reaction mixture cooled, so that the temperature did not rise above 10° C. One hundred milliliters of 5% hydrochloric acid was then added dropwise. The organic layer was separated, washed with water, and dried over silica gel. Distillation gave 28.0 g. (78% yield) of α,α-bis(trifluoromethyl)benzyl alcohol as a colorless liquid, B.P. 50° C./10 mm.; $n_D^{25}$, 1.4128.

*Analysis.*—Calcd. for $C_9H_6F_6O$: C, 44.27%; H, 2.48%. Found: C, 44.56%; H, 2.65%.

EXAMPLE X

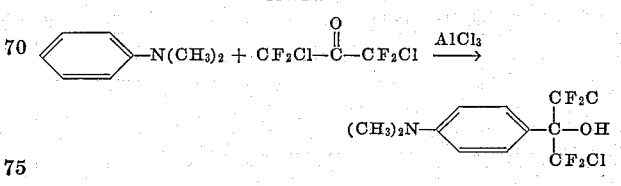

N,N-dimethylaniline (60.5 g., 0.5 mole) was added dropwise to a stirred suspension of 2.0 g. of aluminum chloride in 100 g. (0.5 mole) of dichlorotetrafluoroacetone at such a rate that gentle refluxing was maintained. The reaction mixture was heated at 60° C. for two hours and then distilled through a simple still. The fractions boiling between 140–160° C./0.5 mm. solidified upon standing at room temperature overnight. The solid was recrystallized from pentane to give 124 g. of α,α-bis(chlorodifluoromethyl)-4-dimethylaminobenzyl alcohol as colorless prisms, M.P. 62–64° C. This product was soluble in warm 5% hydrochloric acid and cold 5% sodium hydroxide solution.

*Analysis.*—Calcd. for $C_{11}H_{11}Cl_2F_4NO$: C, 41.27%; H, 3.46%; N, 4.38%. Found: C, 40.97%; H, 3.52%; N, 4.13%.

EXAMPLE XI

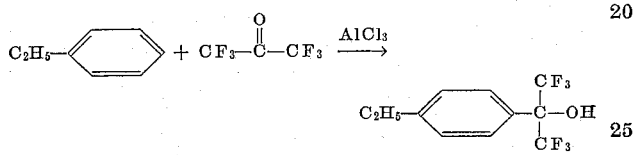

A mixture of 41.5 g. (0.25 mole) of hexafluoroacetone, 106 g. (1 mole) of ethyl benzene and 2 g. of aluminum chloride was heated at 100° C. for eight hours in a 240-ml. "Hastelloy" bomb. The bomb was cooled and vented and the residual liquid was distilled to give 44.9 g. of α,α-bis(trifluoromethyl)-4-ethyl benzyl alcohol as a colorless liquid, B.P. 71–72° C./6.5 mm., $n_D^{25}$ 1.4261.

*Analysis.*—Calcd. for $C_{11}H_{10}F_6O$: C, 48.54%; H, 3.71%. Found: C, 48.98%; H, 3.87%.

EXAMPLE XII

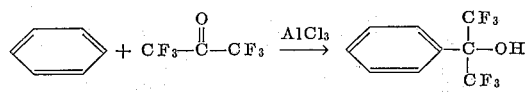

A 240-ml. "Hastelloy" bomb charged with 80 g. (1 mole) of benzene, 41.5 g. (0.25 mole) of hexafluoroacetone and 2 g. of aluminum chloride was heated at 120° C. for eight hours. The bomb was cooled and vented and the residue was distilled to give 51.8 g. (84%) of α,α-bis(trifluoromethyl)benzyl alcohol, B.P. 163.0–163.5° C., $n_D^{25}$ 1.4128.

EXAMPLE XIII

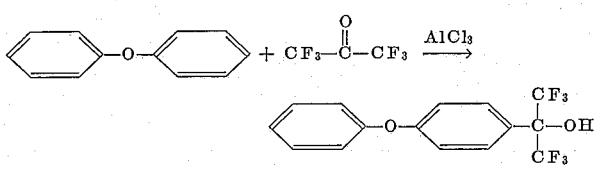

A mixture of 41.5 g. (0.25 mole) of hexafluoroacetone, 42.5 g. (0.25 mole) of diphenyl ether and 2 g. of aluminum chloride was heated at 100° C. for eight hours in a 240-ml. "Hastelloy" bomb. The bomb was cooled and vented and the residue was distilled to give 37.5 g. of a viscous, colorless liquid, B.P. 103–109° C./0.5 mm., that solidified to a white solid upon standing overnight. Recrystallization from pentane gave 29.1 g. of α,α-bis(trifluoromethyl)-4-phenoxybenzyl alcohol as colorless prisms, M.P. 53–54° C.

*Analysis.*—Calcd. for $C_{15}H_{10}F_6O_2$: C, 53.58%; H, 3.00%. Found: C, 54.31%; H, 3.08.

EXAMPLE XIV

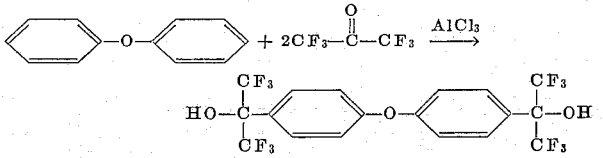

A 145-ml. "Hastelloy" bomb was charged with 17 g. (0.1 mole) of diphenyl ether, 41.5 g. (0.25 mole) of hexafluoroacetone and 1 g. of aluminum chloride and heated at 125° C. for eight hours under autogenous pressure. The bomb was cooled and vented and the residue was distilled under reduced pressure. There was obtained 25.5 g. of 4,4'-bis(2-hydroxyhexafluoro-2-propyl)phenyl ether as a colorless viscous liquid, B.P. 140–144° C./0.9 mm., $n_D^{25}$ 1.4561.

*Analysis.*—Calcd. for $C_{18}H_{10}F_{12}O_3$: C, 43.04%; H, 2.01%. Found: C, 43.10%; H, 2.13%.

EXAMPLE XV

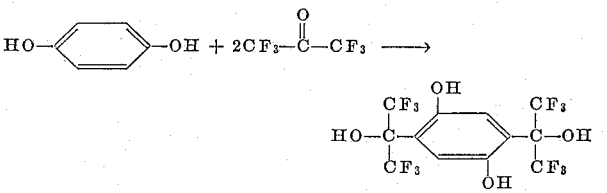

A 240-ml. "Hastelloy" bomb was charged with 11 g. (0.1 mole) of hydroquinone, 70 ml. of dioxane and 41.5 g. (0.25 mole) of hexafluoroacetone and heated at 150° C. for eight hours. The bomb was cooled and filtered and the dark solution was freed from dioxane by heating at 100° C. under reduced pressure. The syrupy residue was dissolved in 140 ml. of 10% sodium hydroxide, treated with decolorizing charcoal and filtered, and then acidified with 50 ml. of concentrated hydrochloric acid. The yellow oil that formed was separated and dissolved in 1 l. of hot water and the aqueous solution was allowed to cool slowly. The white crystalline precipitate that formed was collected on a filter, washed with water and dried. There was obtained 9.1 g. of 2,5-bis(2-hydroxyperfluoro-2-propyl)hydroquinone as white crystals, M.P. 202–203° C.

*Analysis.*—Calcd. for $C_{12}H_6F_{12}O_4$: C, 32.60%; H, 1.37%; N.E., 442%. Found: C, 32.89%; H, 1.54%; N.E., 440%.

EXAMPLE XVI

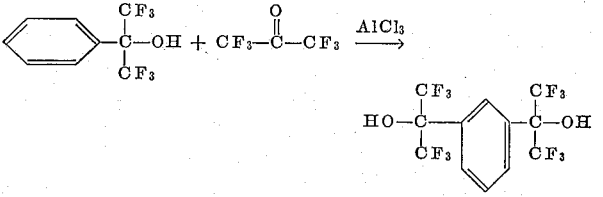

A 145-ml "Hastelloy" bomb was charged wiht 24.4 g. (0.1 mole) of α,α-bis(trifluoromethyl)benzyl alcohol, 25 g. 0.15 mole) of hexafluoroacetone, and 2 g. of aluminum chloride and heated at 225° C. for 8 hours. The bomb was cooled and vented, and the contents were distilled to give 24.8 g. (61%) of 1,3-bis(2-hydroxyhexafluoro-2-propyl)benzene as a colorless liquid, B.P. 77° C./4 mm., $n_D^{25}$ 1.3867.

*Analysis.*—Calcd. for $C_{12}H_6O_2F_{12}$: C, 35.14%; H, 1.48%; F, 55.59%. Found: C, 35.48%; H, 1.80%; F, 55.34%.

Using the reaction conditions of Example I, employing one molar proportion each of the reactants shown in the left and middle columns of Table I, below, there will be obtained the fluorine-containing tertiary aromatic alcohols shown in the right column.

Table I

| Aromatic coreactant | Fluoroketone | Product |
|---|---|---|
| $C_6H_5Cl$ | $H(CF_2)_4-\overset{O}{\underset{\|}{C}}-(CF_2)_4H$ | $H(CF_2)_4-\underset{\underset{C_6H_4Cl}{\|}}{\overset{OH}{\underset{\|}{C}}}-(CF_2)_4H$ |
| $CH_3O-\langle\text{phenyl}\rangle-NO_2$ | $Cl(CF_2)_8-\overset{O}{\underset{\|}{C}}-(CF_2)_8Cl$ | $Cl-(CF_2)_8-\overset{OH}{\underset{\|}{C}}-(CF_2)_8-l$, aryl = $-C_6H_3(NO_2)(OCH_3)$ |
| naphthalene | $CFCl_2-\overset{O}{\underset{\|}{C}}-CFCl_2$ | $CFCl_2-\overset{OH}{\underset{\|}{C}}-CFCl_2$, aryl = naphthyl |
| $HO-C_6H_2(CH_3)_2$ (2,6-xylenol) | $CFBr_2-\overset{O}{\underset{\|}{C}}-CFBr_2$ | $CFBr_2-\overset{OH}{\underset{\|}{C}}-CFBr_2$, aryl = 3,5-dimethyl-4-hydroxyphenyl; plus second product $CF_3$-aryl-$CH_3$ with $OH$ |
| $C_6H_5-N(CH_3)_2$ | $CF_3-\overset{O}{\underset{\|}{C}}-CF_3$ | $CF_3-\overset{OH}{\underset{\|}{C}}-CF_3$, aryl = $p-C_6H_4N(CH_3)_2$ |

Using the reaction conditions of Example IX, employing one molar proportion of each of the reactants in the left and center columns of Table II, below, there will be obtained the fluorine-containing tertiary aromatic alcohols shown in the right column.

Table II

| Organometallic coreactant | Fluoroketone | Product |
|---|---|---|
| $C_6H_4CH_3MgBr$ | $CF_3-\overset{O}{\underset{\|}{C}}-CF_3$ | $CF_3-\underset{\underset{CF_3}{\|}}{\overset{OH}{\underset{\|}{C}}}-C_6H_4CH_3$ |
| $C_6H_5MgBr$ | $ClCF_2-\overset{O}{\underset{\|}{C}}-CF_2Cl$ | $ClCF_2-\underset{\underset{CF_2Cl}{\|}}{\overset{OH}{\underset{\|}{C}}}-C_6H_5$ |
| $C_{10}H_7MgBr$ | $CF_3(CF_2)_4-\overset{O}{\underset{\|}{C}}-(CF_2)_4CF_3$ | $CF_3(CF_2)_4-\underset{\underset{(CF_2)_4CF_3}{\|}}{\overset{OH}{\underset{\|}{C}}}-C_{10}H_7$ |
| $C_{14}H_9MgBr$ | $CF_3-\overset{O}{\underset{\|}{C}}-CF_3$ | $CF_3-\underset{\underset{C_{14}H_9}{\|}}{\overset{OH}{\underset{\|}{C}}}-CF_3$ |

The fluoroaromatic tertiary alcohols of this invention are useful per se and as intermediates in chemical syntheses. Thus, because of their high resistance to thermal and oxidative degradation at temperatures above 200° C., as shown by Example XVI, they are useful as heat-transfer media, e.g., in high-temperature power generating equipment, transformer fluids, etc.

These fluoroaromatic tertiary alcohols are readily converted to the corresponding perfluoro compounds by treatment with $SF_4$, as shown below, and these perfluoro compounds are highly stable, hence useful in stable fluid outlets, such as transformer fluids, hydraulic systems, liquid-coupled mechanical drives, etc. This conversion is shown in the following example.

EXAMPLE A

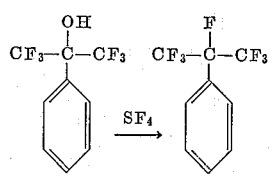

$$CF_3-\underset{\underset{C_6H_5}{\|}}{\overset{OH}{\underset{\|}{C}}}-CF_3 \xrightarrow{SF_4} CF_3-\underset{\underset{C_6H_5}{\|}}{\overset{F}{\underset{\|}{C}}}-CF_3$$

A 145-ml. stainless steel pressure reactor was charged with 24.4 g. of α,α-bis(trifluoromethyl)benzyl alcohol, prepared as in Example IX, and 21.6 g. of sulfur tetrafluoride. The bomb was heated at 150° C. for 8 hours and then cooled and vented. The residue was distilled to give 19.9 g. of heptafluoroisopropylbenzene as a colorless liquid, B.P. 125° C., $n_D^{25}$, 1.3827.

*Analysis.*—Calcd. for $C_9H_5F_7$: C, 43.88%; H, 2.05%; F, 54.04%. Found: C, 44.45%; H, 2.23%; F, 54.59%.

It may be noted that the precursor fluorinated ketones of this application are known compounds preparable by general methods as shown, for example, by Lovelace et al., *Aliphatic Fluorine Compounds*, Reinhold Publishing Co., pp. 182–187 (1958). See also the copending and coassigned patent applications Wiley, Ser. No. 730,266, now U.S. Patent No. 3,091,643, and Simmons, Ser. No. 730,281, both filed April 23, 1958, now U.S. Patent No. 3,029,252.

Since obvious modifications and equivalents in the invention will be evident to those skilled in the chemical arts, I propose to be bound solely by the appended claims.

The embodiments of the invention in which an exclusive property or privilege is claimed are defined as follows:

1. Process for preparing compounds of the formula

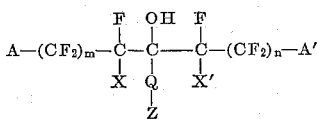

wherein $m$ and $n$ are cardinal numbers of from 0 to 7; X and X' are halogen of atomic number 9–35; A and A' are selected from the group consisting of hydrogen and halogen of atomic number 9–35; Q is a divalent aromatic group selected from the class consisting of (1) arylene of 6–14 carbon atoms, (2) oxydiarylene of 12–16 carbon atoms, (3) said oxydiarylene substituted with lower alkyl groups, (4) said arylene mono-substituted with a group selected from the class consisting of alkyl of up to 15 carbon atoms, cycloalkyl of up to 15 carbon atoms, halogen, dialkylamino having a total of no more than 14 carbon atoms, alkoxy having no more than 7 carbon atoms, hydroxyl, nitro and alkoxycarbonyl of up to 7 carbon atoms; (5) said arylene di-substituted with groups selected from the class consisting of alkyl of up to 15 carbon atoms, hydroxyl, alkoxy having no more than 7 carbon atoms, nitro, and halogen; and (6) said arylene tri-substituted with groups selected from the class consisting of lower alkyl and hydroxyl, in which at least two of the groups are lower alkyl; and Z is selected from the group consisting of hydrogen and

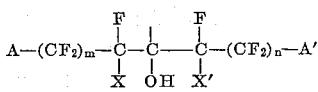

wherein A, A', X, X', $m$ and $n$ are as defined above; which comprises reacting at a temperature of between 0° C. and 350° C. an acyclic α,α'-difluoroketone of the formula

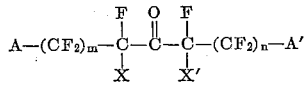

wherein A, A', X, X' $m$ and $n$ are as defined above, with a compound of the formula ZQH wherein Z and Q are as defined above, in the presence of a Friedel-Crafts catalyst selected from the group consisting of aluminum chloride, aluminum bromide, boron trichloride, boron trifluoride, antimony pentachloride, zinc dichloride and ferric chloride.

2. The process of claim 1 in which the acyclic α,α'-difluoroketone is perfluorodiethyl ketone and the ZQH compound is benzene.

3. The process of claim 1 in which the acyclic α,α'-difluoroketone is s-dichlorotetrafluoroacetone and the ZQH compound is benzene.

4. The process of claim 1 in which the acyclic α,α'-difluoroketone is 1,7-dihydroperfluoroheptane-3-one and the ZQH compound is toluene.

5. A compound of the formula

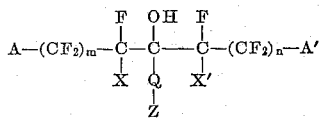

wherein $m$ and $n$ are cardinal numbers of from 0 to 7; X and X' are halogen of atomic number 9–35; A and A' are selected from the group consisting of hydrogen and halogen of atomic number 9–35; Q is a divalent aromatic group selected from the class consisting of (1) arylene of 6–14 carbon atoms, (2) oxydiarylene of 12–16 carbon atoms, (3) said oxydiarylene substituted with lower alkyl groups, (4) said arylene mono-substituted with a group selected from the class consisting of alkyl of up to 15 carbon atoms, cycloalkyl of up to 15 carbon atoms, halogen, dialkylamino having a total of no more than 14 carbno atoms, alkoxy having no more than 7 carbon atoms, hydroxyl, nitro and alkoxycarbonyl of up to 7 carbon atoms; (5) said arylene di-substituted with groups selected from the class consisting of alkyl of up to 15 carbon atoms, hydroxyl, alkoxy having no more than 7 carbon atoms, nitro, and halogen; and (6) said arylene tri-substituted with groups selected from the class consisting of lower alkyl and hydroxyl, in which at least two of the groups are lower alkyl; and Z is selected from the group consisting of hydrogen and

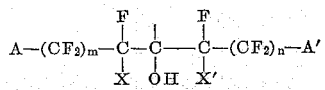

wherein A, A', X, X', $m$ and $n$ are as defined above.

6. Phenyl-bis(perfluoroethyl)carbinol.
7. α,α-Bis(chlorodifluoromethyl)benzyl alcohol.
8. 1H,7H-2-p-methylphenylperfluoroheptan-3-ol.
9. Bis(trifluoromethyl)-o-hydroxyphenylcarbinol.
10. α - (Chlorodifluoromethyl) - α - (dichlorofluoromethyl)-4-hydroxybenzyl alcohol.
11. α,α - Bis(chlorodifluoromethyl) - 4 - hydroxy - 3-ethylbenzyl alcohol.
12. 1,7 - Dihydro - 3 - p - hydroxyphenylperfluoroheptan-3-ol.
13. α,α-Bis(trifluoromethyl)benzyl alcohol.
14. α,α - Bis(chlorodifluoromethyl) - 4 - dimethylaminobenzyl alcohol.
15. 4,4' - Bis(2 - hydroxyhexafluoro - 2 - propyl)-phenyl ether.
16. Bis - m - (2 - hydroxyhexafluoro - 2 - propyl)-benzene.
17. α,α-Bis(trifluoromethyl)-4-phenoxybenzyl alcohol.

References Cited by the Examiner

Fieser et al.: Organic Chemistry, p. 537 (1956), third edition.

Knunyants et al.: Izvest. Akad. Nauk SSSR, Otd. Khim. Nauk, pages 686–692 (1960).

Tarrant, et al.: "Jour. Org. Chem.," vol. 24, pages 238–239 (1959).

LEON ZITVER, *Primary Examiner.*

HAROLD G. MOORE, *Examiner.*